United States Patent
Brockmann et al.

(10) Patent No.: US 6,186,097 B1
(45) Date of Patent: Feb. 13, 2001

(54) PROTECTION SHOE FOR THE PAW OF A DOG

(76) Inventors: Sandra Brockmann; Arne Knuth, both of Dorfstr., 18 a, 24361 Haby (DE)

( * ) Notice: Under 35 U.S.C. 154(b), the term of this patent shall be extended for 0 days.

(21) Appl. No.: 09/149,149

(22) Filed: Sep. 8, 1998

(30) Foreign Application Priority Data

Jan. 17, 1998 (DE) .......................................... 298 00 774 U
Apr. 25, 1998 (DE) .......................................... 298 07 500 U

(51) Int. Cl.[7] ................................................. A01K 13/00
(52) U.S. Cl. ............................................. 119/850; 36/111
(58) Field of Search .................................. 119/850; 54/82, 54/79.2, 79.3, 79.4; D30/145, 146; 36/111, 89, 97, 117.8, 58.6

(56) References Cited

U.S. PATENT DOCUMENTS

| | | | |
|---|---|---|---|
| 3,762,073 | * | 10/1973 | Cantales .................................. 36/111 |
| 4,457,261 | * | 7/1984 | Marshall .................................. 54/82 |
| 4,510,888 | * | 4/1985 | DeAngelis et al. .................. 119/850 |
| 4,543,911 | | 10/1985 | Marshall . |
| 4,550,446 | * | 11/1985 | Herman ................................ 2/239 |
| 4,967,494 | * | 11/1990 | Johnson ................................ 36/9 R |
| 4,981,010 | * | 1/1991 | Orza et al. ........................... 54/82 |
| 5,361,564 | * | 11/1994 | Hickman .............................. 54/80.4 |
| 5,408,812 | * | 4/1995 | Stark ....................................... 54/82 |
| 5,495,828 | | 3/1996 | Solomon et al. . |
| 5,617,585 | * | 4/1997 | Fons et al. ............................. 2/239 |
| 5,871,458 | * | 2/1999 | Detty ..................................... 602/27 |
| 5,926,843 | * | 7/1999 | Winchester ........................... 2/22 |

FOREIGN PATENT DOCUMENTS

| | | |
|---|---|---|
| 295 08 928 U | 9/1995 | (DE) . |
| 297 06 992 U1 | 6/1997 | (DE) . |
| 297 09 329 U1 | 10/1997 | (DE) . |
| 0 037 745 A1 | 10/1981 | (EP) . |
| 2 308 285 | 6/1997 | (GB) . |

* cited by examiner

Primary Examiner—Peter M. Poon
Assistant Examiner—Yvonne R. Abbott
(74) Attorney, Agent, or Firm—Howson and Howson

(57) ABSTRACT

The present invention relates to a protection shoe for the paw of a dog, particularly formed like a sock and made of a flexible material. According to the invention it is provided that the material of the protection shoe has at least two layers at least the outer layer of which consists of an breathable semipermeable material elastically stretchable in lengthwise and cross direction and which is impermeable to water from outside and permeable to humidity from the inside.

17 Claims, 2 Drawing Sheets

US 6,186,097 B1

PROTECTION SHOE FOR THE PAW OF A DOG

BACKGROUND OF THE INVENTION

The present invention relates to a protection shoe for the paw of a dog, particularly formed like a sock and made of a flexible material.

A protection shoe of this kind provides not only a protection of the bandage of a paw (in case of hurts) against wetness and soaking from outside but also a protection of the paw against external influences by chemical substances, sharp objects or the like. For example dogs of the police or customs authorities or dogs of a rescue team are exposed to such high demands.

Such a protection shoe is known of the German DE-U 295 08 928.8. This protection shoe comprises a cotton sock which is immersed into a synthetic solution. Thus created outer skin is absolutely water-proof but not breathable. This has the disadvantage that the sweatiness of the dog cannot get to the outside. In this case, a possible bandage will therefore become wet and the healing process will be prevented or delayed. Another disadvantage to be mentioned is that the outer skin is only flexible but not stretchable. Together with a fixing of the protection shoe by a surrounding strap, this can cause an overstrain especially of the rear tendon of the leg.

SUMMARY OF THE INVENTION

It is an object of the present invention to provide an improved protection shoe as descriped above which avoids the above-mentioned existing disadvantages.

According to the invention the object is achieved in that the material of the protection shoe has at least two layers at least the outer layer of which consists of an breathable semipermeable material elastically stretchable in lengthwise and cross direction and which is impermeable to water from outside and permeable to humidity from the inside. This kind of design of a protection shoe has on the one hand the advantage that the paw and/or the bandage is protected against humidity coming from the outside and on the other hand the sweatiness from the inside can get to the outside.

A further advantage of the present invention is the facilitation in putting the protection shoe over the paw and/or the bandage due to the elastical stretchability of the material in lengthwise and cross direction. Furthermore, the tendon of the concerned leg is not obstructed.

According to one embodiment of the present invention, it is provided that the outer skin comprises polytetrafluorethylene (PTFE). The inner layer which faces the paw can be made of smooth fleece-like material or similar material. By using this material, the requested properities can be achieved. The material of the inner layer can be made e.g. of a synthethic fleece.

In accordance with another embodiment of the present invention it is provided that the material comprises a layer of chloroprene-caoutchouc which is coated on at least one side with a nylon-layer (Neoprene®). Preferably, the chloroprene-caoutchouc-layer is coated on both sides with a nylon-layer. Thus, an breathable material will also be provided which is furthermore extremely elastical and does not hinder the dog.

It can be suitable if the area of the sole of the outer layer is coated with a granulate such that the stretchability of the material will not or only unessentially be reduced. With that, the dog gets a sufficient non-slipping hold when walking or running. Due to the maintained elastical stretchability in the area of the coated sole the dog can walk on safely.

It can also be provided that the outer layer is coated in the area of the sole with a rubber-like strengthening layer which can have profile. Thus the walking-feeling of the dog will also not be influenced. Furthermore, no disturbing noise during walking on asphalt or the like occurs. The strengthening layer can for example be laminated onto the outer layer.

Especially in this case it is advisable that the strengthening layer is connected with the outer layer via blind stitch seams. Generally, it is also possible to work up all layers with such blind stitch seams. The blind stitch seams do not get totally through the material. The stitch will only be leaded up to the middle of the externally located layers. This has the advantage that there cannot be caused any leaky spots by the seam. Moreover, the blind stitch seams are elastical so that they can stand strong strains.

In accordance with a further embodiment of the present invention it is provided that in case of a protection shoe which is fixed to the leg of a dog by at least one strap, which in closed condition surrounds the leg of a dog at least partially, the strap will be equipped at least in the area of the rear tendon of a leg with an elastical area. Thus it is achieved that the tendon of the leg can be stretched freely and will not be hindered by the strap which is tight apart from that. Especially the equipping of a shoe with the elastically stretchable material in lengthwise as well as in cross direction creates a protection shoe which provides an optimal hold and at the same time gives an unhindered freedom of movement of the leg and the concerned tendon respectively.

It can be provided that the area of extensibility will be formed by an extensible segment of the strap. The area of extensibility can also be designed as a fold in the strap which fold is not connected with the protection shoe in this area. It can also be suitable if essentially the total strap is made elastically. Thus a sufficient extensibility also in the area of the rear tendon will be achieved.

It is however suitable when the area of extensibility is arranged as a gap of the strap in this area. The necessary extensibility will then be defined by the extensibility of the used material. Particularly this arrangement of the area of extensibility can be prepared easily.

Generally, the sort of the fastener of the strap can be of any kind. However, it is suitable if the strap is equipped with a hook and loop VELCRO® fastener which is relatively insensible against wetness and pollutions and can quickly be closed and opened. Furthermore, the dog will not be hindered by buckles or the like.

BRIEF DESCRIPTION OF THE DRAWINGS

In the following the present invention will be explained in detail with the schematic drawing. In the drawing.

DETAILED DESCRIPTION OF THE DRAWING

Figures 1, 2, 3:
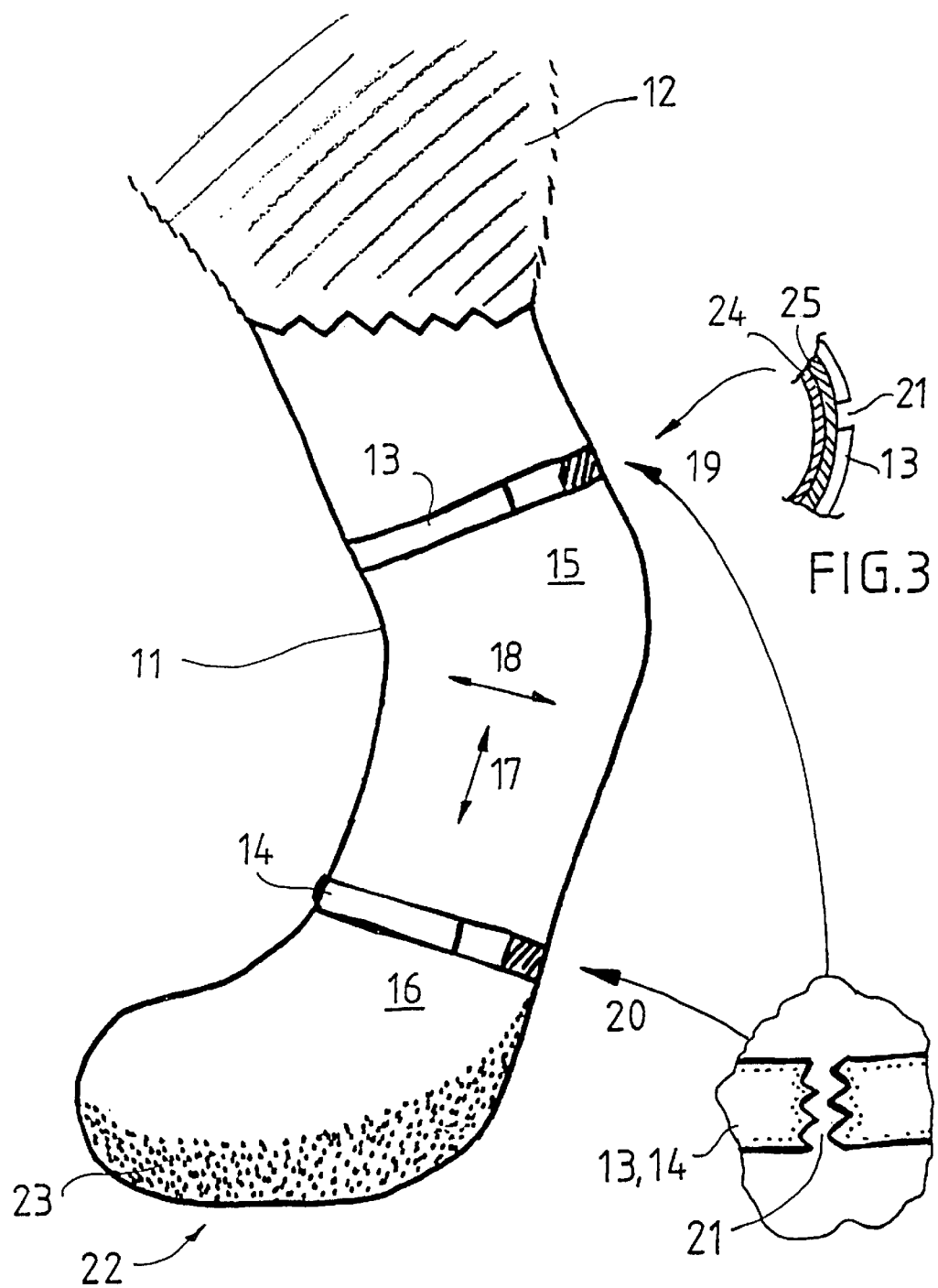
FIG. 1 is the view of the rear leg of a dog with a protection shoe according to the present invention, FIG. 2 in enlarged representation of the area of extensibility of the strap with FIG. 3 a sectional view taken along the area of the straps of the protection shoe.

The protection shoe 11 shown in the drawing for the leg 12 of a dog is particularly formed like a sock so that it can be easily put over the paw. The protection shoe will be fastened to the leg via two straps 13, 14. The straps can e.g. be equipped with a hook and loop VELCRO® fastener 26. The strap 13 is directly placed above the knee-joint 15 and the strap 14 is placed directly above the ankle-joint 16. Thus a tight fastening of the protection shoe will be achieved.

The protection shoe 11 comprises two layers. The inner layer 24 facing the paw is made of a smooth, elastical fleece-like material. The outer layer 25 consists of a semi-permeable material which is elastically stretchable to the lengthwise direction 17 and cross direction 18. This layer 25 is made that way that an entering of water will be avoided. However, the layer is breathable so that humidity from the inside can get to the outside.

The drawing shows a two-layer design. But it can also be provided a three-layer design. In this case, the layer in the middle can be made e.g. of chloroprene-caoutchouc which is coated with nylon on both sides.

The material is selected such that the protection shoe has a certain inherent stability so that a collapse of the shoe will be avoided. Due to the inherent stability of the protection shoe it remains particularly in an upright position and will be held on the leg partially by itself without the straps because of the elasticity of the outer material. An inadvertently slipping off also in case of an untied strap will thus be rendered more difficult.

Figure 4:
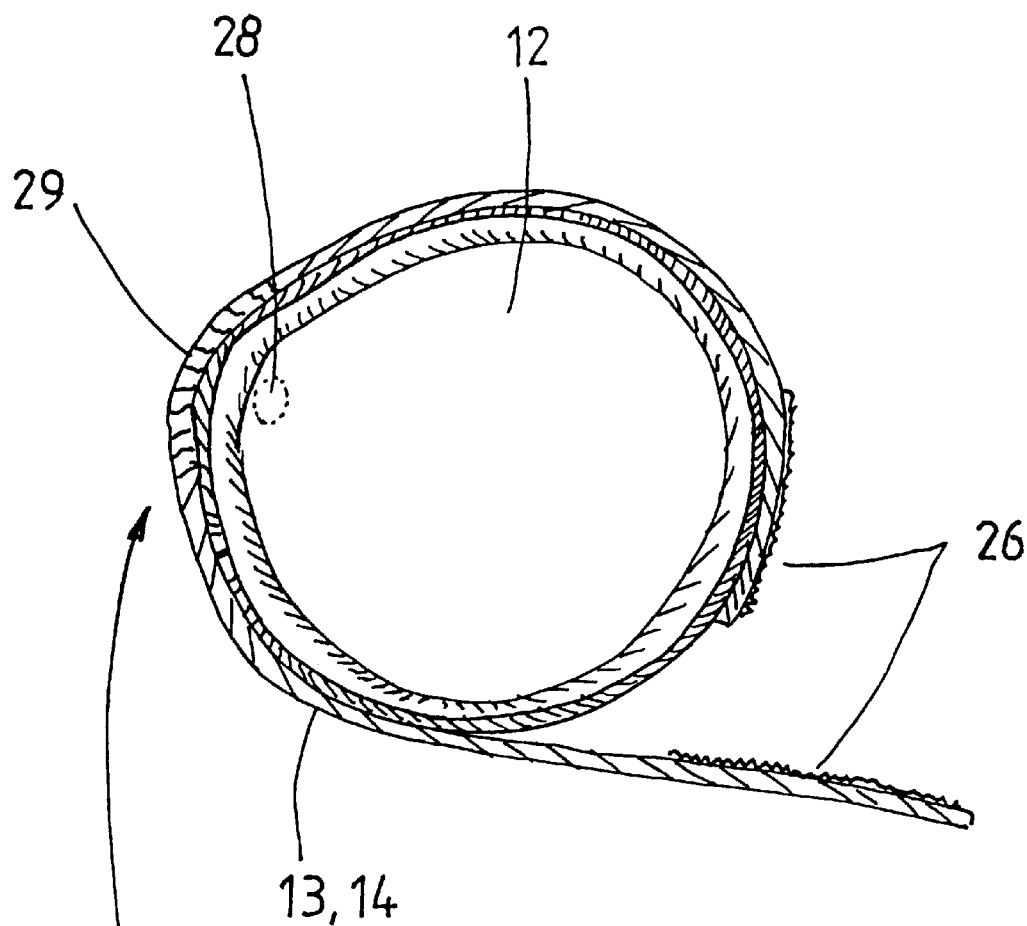
FIG. 4 is a cross-sectional plan view of a protection shoe having an alternate strap configuration.
Figure 5:
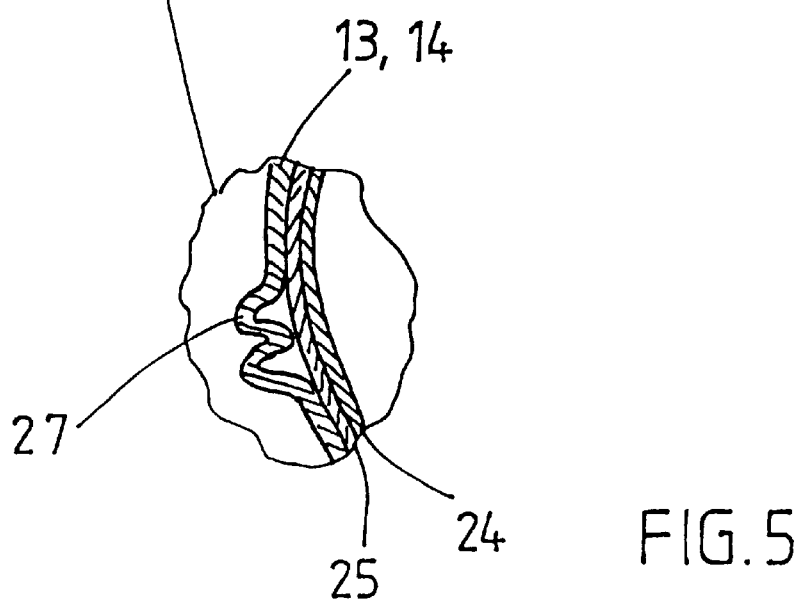
FIG. 5 is an enlarge representation of the area of extensibility of the strap illustrated in FIG. 5.

Normally, the strap consists of an unelastical material, e.g. a textile band which is equipped with a hook and loop Velcro® fastener. This textile band is normally sewed up with the protection shoe or glued to the outer layer. In order to achieve the required extensibility of the protection shoe in the area 19, 20 of the rear tendon 28 of a leg the strap 13, 14 comprises a gap 21 there. Alternatively, as illustrated in FIGS. 4 and 5, the extensible area 29 is provided by and expandable fold 27 in the strap 13, 14. Thus it will be effected easily that the tendon can be streched freely without any impairment of the hold of the protection shoe on the paw. Therefore, an injury of the tendon will be avoided also in case of the use of the protection shoe for a longer or regular period.

Further, the protection shoe has a granulate layer 23 in the area of the sole 22 which layer 23 is deposited on the outer layer such that the elastical extensibility of this layer will not be influenced. Thus, a slipping of the paw during walking of the dog will be avoided on the one hand. On the other hand, the dog keeps the feeling for the underground on which it presently stands due to the maintained elasticity.

The drawing shows a high protection shoe. It is of course also possible to have only a lower shoe which only extends over the first ankle. In this case, only one strap above the ankle-joint must be provided.

It is a matter of course that the protection shoe can also be used for the front paw. In this case, the shoe will have another form in order to achieve a good hold so that the dog will not be hindered during running or walking. It is obviously that such protection shoes allow a comfortable walking and bandage protection and do not or only unessentially hinder the dog.

What is claimed is:

1. Protection shoe for the paw of a dog which is particularly formed as a sock and which can be fixed at a leg of the dog by at least one strap which surrounds the leg of the dog at least partially when closed, wherein the shoe is made from a material which is elastically stretchable in the lengthwise and cross direction and which comprises at least two layers, an outer layer of which is made of a breathable semipermeable material which is impermeable to water from the outside and permeable to humidity from the inside, and wherein the strap is equipped with an extensible area in an area adjacent a rear tendon of the leg of the dog, and wherein the outer layer of the shoe comprises polytetrafluoroethylene (PTFE) and an inner layer of the shoe facing the paw is made of a smooth fleece-like material.

2. Protection shoe according to claim 1, wherein one layer consists of chloroprene-caoutchouc which is coated at least on one side, preferably on both sides, with a nylon-layer.

3. Protection shoe according to claim 1, wherein the material of the shoe has a determined inherent stability in order to avoid the collapse of the protection shoe.

4. Protection shoe according to claim 1, wherein the area of the sole of the shoe is coated with a granulate such that the extensibility of the material will not or only unessentially be reduced.

5. Protection shoe according to claim 1, wherein an area of a sole of the shoe is coated with a rubber-like strengthening layer.

6. Protection shoe according to claim 1, wherein at least the outer layer is worked up with blind stitch seams.

7. Protection shoe according to claim 1, wherein the extensible area is formed by an extensible section of the strap.

8. Protection shoe according to claim 1, wherein the extensible area is formed as a gap of the strap in this area.

9. Protection shoe according to claim 1, wherein the extensible area is created as a fold in the strap which is not fixed to the protection shoe in this area.

10. Protection shoe according to claim 1, wherein the strap is elastic.

11. Protection shoe according to claim 1, wherein the strap has a hook and loop fastener.

12. Protection shoe according to claim 1, wherein one strap is located on the shoe such that, when the shoe is worn by the dog, said one strap is located above the ankle-joint of the leg of the dog.

13. Protection shoe according to claim 1, wherein one strap is located on the shoe such that, when the shoe is worn by the dog, said one strap is located above the knee-joint of the leg of the dog.

14. A protection shoe for a paw and leg of a dog, comprising:

a sock of a material which is elastically stretchable in lengthwise and crosswise directions and which includes an outer layer and at least one other layer, said outer layer being a breathable semipermeable material which is impermeable to moisture from outside and permeable to humidity from inside; and at least one strap positionable in a closed condition so that said strap at least partially surrounds the leg of the dog and retains said sock on the leg of the dog, said strap having an extensible area which is located adjacent a rear tendon of the leg of the dog when said strap is in said closed condition;

wherein said extensible area of said strap is selected from the group consisting of an elastic section of said strap, a gap in said strap, and a fold in said strap unaffixed to said shoe; and wherein said outer layer is made of polytetrafluoroethylene (PTFE) and said at least one other layer faces the paw and is made of a smooth fleece-like material.

15. A protection shoe for a paw and leg of a dog, comprising:

a sock of a material which is elastically stretchable in lengthwise and crosswise directions and which includes an outer layer and at least one other layer, said outer layer being a breathable semipermeable material which is impermeable to moisture from outside and permeable to humidity from inside; and at least one strap having opposite ends positionable in a closed condition so that said strap at least partially surrounds the leg of the dog and retains said sock on the leg of the dog, said strap having an extensible area which is located adjacent a rear tendon of the leg of the dog when said strap is in said closed condition;

wherein said extensible area of said strap is selected from the group consisting of an elastic section of said strap, a gap in said strap, and a fold in said strap unaffixed to said shoe; and wherein said sock includes a layer of material made of chloroprene-caoutchouc coated with nylon.

16. A protection shoe for a paw and leg of a dog, comprising:

a sock of a material which is elastically stretchable in lengthwise and crosswise directions and which includes an outer layer and at least one other layer, said outer layer being a breathable semipermeable material which is impermeable to moisture from outside and permeable to humidity from inside; and at least one strap positionable in a closed condition so that said strap at least partially surrounds the leg of the dog and retains said sock on the leg of the dog, said strap having an extensible area which is located adjacent a rear tendon of the leg of the dog when said strap is in said closed condition;

wherein said extensible area of said strap is selected from the group consisting of an elastic section of said strap, a gap in said strap, and a fold in said strap unaffixed to said shoe;

wherein said shoe has a pair of straps such that, when said shoe is positioned on the leg of the dog, one of said straps extends above the knee-joint of the leg of the dog and the other of said straps extends below the knee-joint and above the ankle-joint of the leg of the dog; and wherein said outer layer is made of polytetrafluoroethylene (PTFE) and said at least one other layer faces the paw and is made of a smooth fleece-like material.

17. A protection shoe for a paw and leg of a dog, comprising:

a sock of a material which is elastically stretchable in lengthwise and crosswise directions and which includes an outer layer and at least one other layer, said outer layer being a breathable semipermeable material which is impermeable to moisture from outside and permeable to humidity from inside; and at least one strap positionable in a closed condition so that said strap at least partially surrounds the leg of the dog and retains said sock on the leg of the dog, said strap having an extensible area which is located adjacent a rear tendon of the leg of the dog when said strap is in said closed condition;

wherein said extensible area of said strap is selected from the group consisting of an elastic section of said strap, a gap in said strap, and a fold in said strap unaffixed to said shoe;

wherein said shoe has a pair of straps such that, when said shoe is positioned on the leg of the dog, one of said straps extends above the knee-joint of the leg of the dog and the other said straps extends below the knee-joint and above the ankle-joint of the leg of the dog; and wherein said sock includes a layer of material made of chloroprene-caoutchouc coated with nylon.

* * * * *